United States Patent
Arul Dhas et al.

(10) Patent No.: US 12,158,812 B1
(45) Date of Patent: Dec. 3, 2024

(54) MANAGEMENT OF INGESTION JOBS USING AUTOMATED RETRY

(71) Applicant: Wells Fargo Bank, N.A., San Francisco, CA (US)

(72) Inventors: Jashua Thejas Arul Dhas, Charlotte, NC (US); Ganesh Kumar, Suwanee, GA (US); Marimuthu Muthan, Pleasanton, CA (US); Aditya Kulkarni, Hyderabad (IN); Sai Raghavendra Neralla, Andhra Pradesh (IN); Anshul Chauhan, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 154 days.

(21) Appl. No.: 17/663,304

(22) Filed: May 13, 2022

(51) Int. Cl.
*G06F 11/14* (2006.01)
*G06F 16/23* (2019.01)
*G06F 16/245* (2019.01)

(52) U.S. Cl.
CPC ...... *G06F 11/1402* (2013.01); *G06F 16/2358* (2019.01); *G06F 16/245* (2019.01); *G06F 2201/81* (2013.01)

(58) Field of Classification Search
CPC .............. G06F 11/1402; G06F 16/245; G06F 16/2358; G06F 2201/81
See application file for complete search history.

(56) References Cited

U.S. PATENT DOCUMENTS

| | | | |
|---|---|---|---|
| 11,403,184 B1* | 8/2022 | Kumar | G06F 11/0772 |
| 2007/0083866 A1* | 4/2007 | Mani | G06F 9/542 |
| | | | 718/102 |
| 2015/0143376 A1* | 5/2015 | Ruggiero | G06F 9/466 |
| | | | 718/101 |
| 2015/0160974 A1* | 6/2015 | Kishore | G06F 9/4881 |
| | | | 718/106 |
| 2016/0019091 A1* | 1/2016 | Leber | G06F 11/0793 |
| | | | 718/106 |
| 2017/0139956 A1* | 5/2017 | Qiao | G06F 16/11 |
| 2020/0320130 A1* | 10/2020 | Korpman | G06F 40/295 |
| 2021/0064499 A1* | 3/2021 | Dageville | G06F 16/2474 |
| 2021/0064503 A1* | 3/2021 | Dageville | G06F 16/2474 |
| 2022/0276935 A1* | 9/2022 | Kumar | G06F 11/1446 |
| 2022/0283891 A1* | 9/2022 | Bolagani | G06F 11/0793 |
| 2022/0365781 A1* | 11/2022 | Narayan | H04L 63/1408 |
| 2023/0305928 A1* | 9/2023 | Bohra | G06F 9/5038 |

FOREIGN PATENT DOCUMENTS

WO  WO-2012166689 A2 * 12/2012  .............. G06F 11/00

* cited by examiner

*Primary Examiner* — Matthew M Kim
*Assistant Examiner* — Indranil Chowdhury
(74) *Attorney, Agent, or Firm* — Merchant & Gould P.C.

(57) ABSTRACT

An example system can include: at least one processor; and non-transitory computer-readable storage storing instructions that, when executed by the at least one processor, cause the system to: generate an ingestion manager programmed to ingest data associated with a job; and generate a logging manager programmed to capture metadata associated with the job; wherein the ingestion manager is programmed to automatically retry the job based upon the metadata captured by the logging manager.

20 Claims, 5 Drawing Sheets

MANAGEMENT OF INGESTION JOBS USING AUTOMATED RETRY

BACKGROUND

Thousands of large ingestion jobs are run daily for businesses. These jobs can depend on many factors to run effectively, and the failure of one or more of the jobs can have a detrimental impact on the processes of these businesses. The management of these jobs can take significant resources to run efficiently.

SUMMARY

Embodiments of the disclosure are directed to the management of ingestion jobs.

In one aspect, an example system can include: at least one processor; and non-transitory computer-readable storage storing instructions that, when executed by the at least one processor, cause the system to: generate an ingestion manager programmed to ingest data associated with a job; and generate a logging manager programmed to capture metadata associated with the job; wherein the ingestion manager is programmed to automatically retry the job based upon the metadata captured by the logging manager.

The details of one or more techniques are set forth in the accompanying drawings and the description below. Other features, objects, and advantages of these techniques will be apparent from the description, drawings, and claims.

DETAILED DESCRIPTION

Embodiments of the disclosure are directed to the management of ingestion jobs.

In one or more of the examples provided herein, various different types of jobs are ingested into one or more distributed file systems. Each of these jobs is logged in a database, including the success or failure thereof. Upon a failure, the job can be automatically retried at periodic intervals until the job is successful or the number of retries exceeds a threshold (set as a retry parameter described below). Many alternative configurations are possible.

Figure 1:
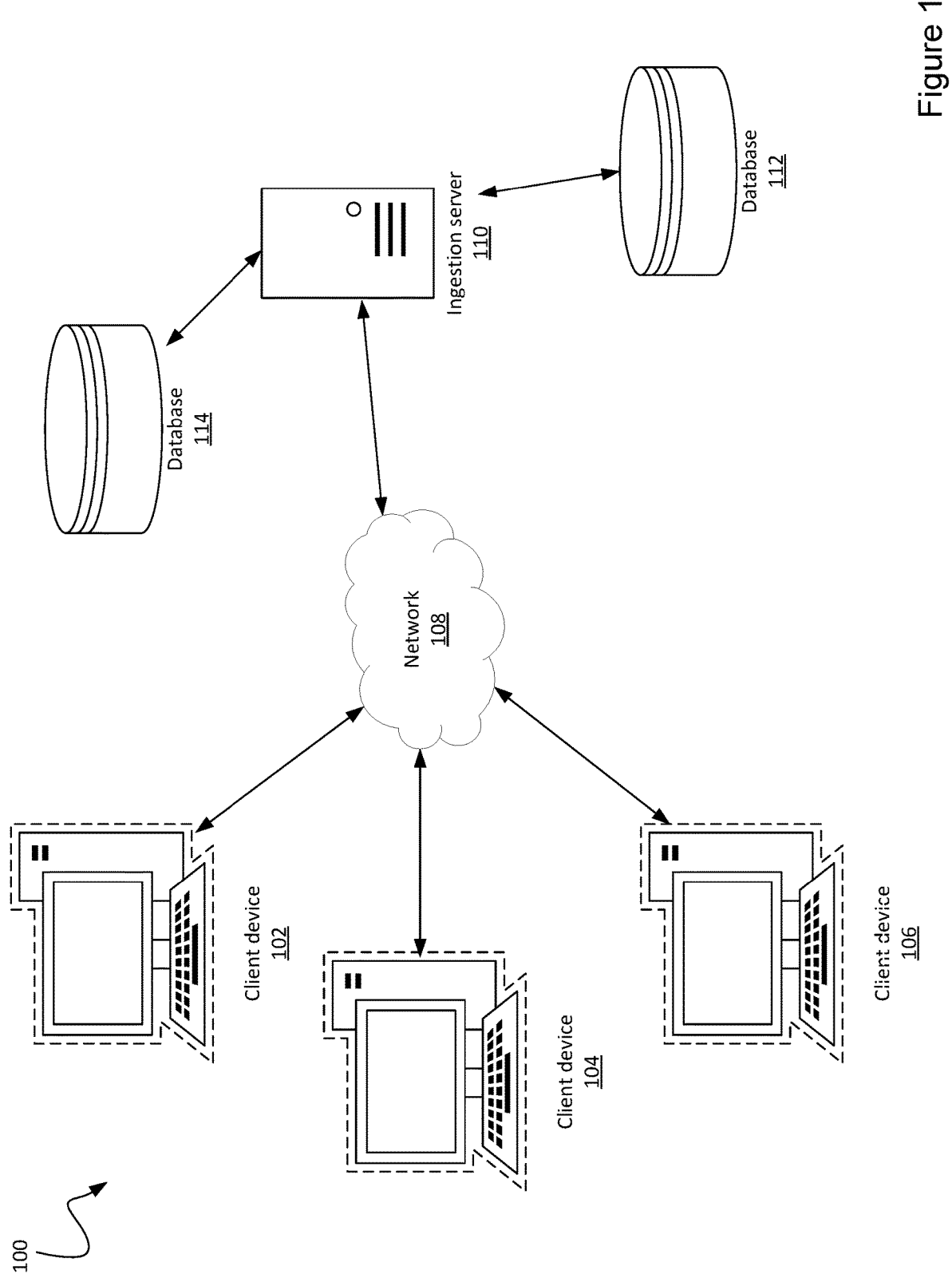
FIG. 1 shows an example system programmed to manage ingestion jobs.

FIG. 1 shows example components of a system 100 that is programmed to manage the ingestion of jobs. Examples of such jobs include daily, weekly, and/or monthly jobs that involve the ingestion of data into the system 100. For instance, an example job can include customer transactional information that is provided by an external system. The customer transactional information is processed and incorporated ("ingested") into the system 100. For instance, such a job can be ingested into a distributed file system, such as a Hadoop Distributed File System including Apache Hive.

The example system 100 generally includes client devices 102, 104, 106 that are programmed to communicate with an ingestion server 110 through a network 108. The components of the system 100 can include one or more computing devices, such as laptops, desktops, tablets, servers, server farms, etc. Each of the computing devices includes one or more storage media encoding instructions which, when executed by one or more processors, implement the functionality described herein.

Although multiple computing devices are shown in system 100, the functionality described herein can be implemented on one or many computing devices. In such examples, each of the computing devices communicates with the others through the network 108. The network 108 can be any suitable data network, such as the internet, a wide area network, a local area network, a wired network, a wireless network, a cellular network, a satellite network, a near field communication network, or any operatively connected combination of these.

In this example, each of the client devices 102, 104, 106 is programmed to provide an ingestion job to the ingestion server 110. Although three client devices are shown, in practice hundreds or thousands of devices can connect to the ingestion server 110 to provide hundreds or thousands of jobs for ingestion.

The ingestion server 110 can accept various source files from the clients 102, 104, 106. Examples of such source file formats include, without limitation: text files; and Java Database Connectivity (JDBC), for instance data from Oracle, SQL Server, Teradata, etc. Other format types can also be used. The ingestion server 110 can receive many different types of source files. Further, the ingestion server 110 can be programmed using various languages, such as python, shell scripting, etc.

Generally, the ingestion server 110 receives each of the ingestion jobs, processes the ingestions jobs, and stores the extracted data from the ingestion in a database 112. As noted, the database 112 can be a distributed file system or other similar structure that provides access to the data associated with the ingested job.

The ingestion server 110 can also be programmed to log the status of each ingestion job in a database 114. As described further below, the logging of the statuses of each job allows the ingestion server 110 to manage the jobs. Should an ingestion job fail, the ingestion server 110 is programmed to manage that failure, including the possible re-initiation of the ingestion job at periodic intervals until the job is successful or a number of retries exceeds the retry parameter.

As described further below, the ingestion server 110 can be programmed to communicate with the databases 112, 114, using a series of Structured Query Language (SQL) commands or similar functionality. The databases 112, 114 can be of various types, such as centralized, distributed, and/or relational. In one example, the database 114 is an embedded database driven by an SQLite database engine, which allows for greater speed in accessing the metadata in the database 114, although many other configurations are possible.

There can be one or more advantages associated with the example system 100. For instance, the system 100 results in the practical application of resolving the technical problems associated with ingestion jobs that fail. The system 100 can solve this technical issue by providing the functionality described herein to manage those failures. This results in greater optimization for the system 100 since the ingestion jobs are managed in a more efficient manner. Many other practical applications and associated efficiencies can be realized.

Figure 2:
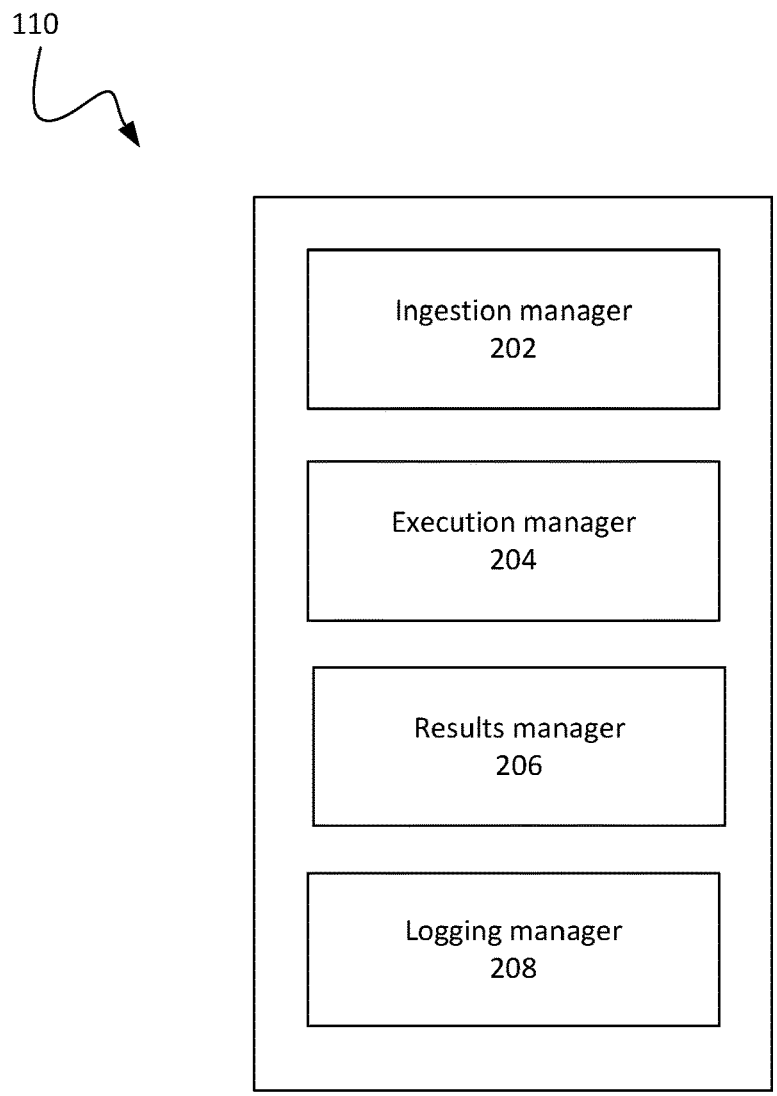
FIG. 2 shows example logical components of an ingestion server of the system of FIG. 1.

Referring now to FIG. 2, example logical components of the ingestion server 110 are shown. In this instance, the ingestion server 110 includes an ingestion manager 202, an execution manager 204, a results manager 206, and a logging manager 208.

The example ingestion manager 202 is programmed to manage the ingestion of the jobs from the clients 102, 104, 106. This can include both receiving the job for "pre-ingestion" along with associating certain metadata with the job.

In some examples, the ingestion manager 202 is programmed to receive a job from one of the clients 102, 104, 106 through YAML, a data-serialization language. Upon receipt, the ingestion manager 202 creates an entry in the database 114 to capture the metadata associated with the job. The ingestion manager 202 can thereupon assign the job a globally unique identifier (GUID) and set the status of the job to "loading".

The ingestion manager 202 can also define other attributes associated with the job, such as how to handle the job should the ingestion fail. In some examples, the ingestion manager 202 can define additional parameters, such as the number of times that a job can be retried upon failure.

In one example, the number of times that a job can be retried is the retry parameter. The retry parameter can be set at a default number, such as "4". In other embodiments, the retry parameter can be set at other fixed values or even be made variable. For example, the retry parameter can be set based upon the type of job, with more important jobs having a greater retry parameter. Many configurations are possible.

Further, the ingestion manager 202 can set the frequency at which retries are made. For example, the ingestion manger 202 can set a frequency parameter that defines how often the job is retried. Examples values for the frequency parameter include, without limitation, hourly, daily, weekly, or monthly. In one example, the frequency parameter is set at a fix value for each job, such as "daily". In other examples, the frequency parameter can be set at other fixed values or made variable based upon the type of job. For example, jobs can be set to retry at a frequency that coincides with the availability of source data (e.g., hourly, daily, weekly, or monthly).

In some embodiments, the ingestion manager 202 can also be programmed to allow for the definition of a particular range for a job in addition to the frequency. For instance, the ingestion manager 202 can be programmed to set the frequency for a job at daily and set a date range. The date range can be a specified number of days, such as: 2021 Aug. 5 to 2021 Aug. 9. Or, the date range can be defined in terms of the current date as follows.

START_DT_$N$=Current date−5

END_DT_$N$=Current date−2

In this example, the date range is set between "START_DT_N" and "END_DT_N". The START_DT_N of the example date range is defined as five days prior to the current date. The END_DT_N of the example date range is defined as two days prior to the current date. Many other configurations are possible.

The ingestion manager 202 can also populate other metadata associated with the job, such as the name of the job and the target table where the ingested data will be stored in the database 112. The ingestion manager 202 can also define a start time for the job. One non-limiting example of an example record for the job in the database 114 as created by the ingestion manger 202 can include the following fields.

| Job identifier | Job name | Target table | Status | Start time | End time | Retry parameter | Frequency parameter |
|---|---|---|---|---|---|---|---|
| 111000 | Customer trans | Credit_transactions_table | Loading | 2021 Aug. 17 5:15 | | 4 | daily |

The ingestion manager 202 can be further programmed to perform data quality checks as part of the initial ingestion process. For instance, the ingestion manager 202 can be programmed to determine that certain fields of the record are always populated, such as job name, target table, and frequency parameter. In addition, the ingestion manager 202 can be programmed to determine that other fields have not already been populated, such as the job identifier field. These quality checks can result in the ingestion manager 202 issuing an alert upon failure. Such checks can be performed at initial onboarding of the job and may not be repeated upon retries of the job.

In addition to periodic retries, the ingestion manager 202 can be programmed to support ad hoc retries. In such a scenario, the user can request an ad hoc retry of a job by creating a text file identifying the job and providing a time to initiate the retry. One example of such a text file is the following.

| Job identifier | Status | Initiation time |
|---|---|---|
| 111000 | Initiate | Nov. 1, 2021 9:06 |

The ingestion manager 202 can be programmed to accept such a file, and the status "initiate" can thereupon be interpreted by the execution manager 204 to initiate a retry for the job at the noted initiation time, as described further below.

The example execution manager 204 is programmed to ingest the data and store the data in the database 112. This can include various processing and transformation of the data, accessing external data, storing of the ingested data, etc.

In some examples, the execution manager 204 is programmed to read the status information associated with the job. When the status of the job is "loading" because the job has just been received, the execution manager 204 will execute the job. Likewise, when the status of the job is "failed", the execution manager 204 will retry the job at periodic intervals until the job is successful or a number of retries as defined by the retry parameter has been exceeded.

The example results manager 206 is programmed to present the results of the ingestion. This can include the generation of notifications and/or user interfaces that provide details on the status of the job. Many configurations are possible.

In some examples, the results manager 206 is programmed to determine the number of retries for a job by querying the database 114 to validate the number of retries that have been made for the job. In some examples, this validation query is constructed automatically by the results manager 206. For instance, the validation query can be constructed based upon one or more of the job identifier, the table name where the data will be stored, and the start and end times for the job. The results manager 206 is programmed to count the number of entries for that job in the database 114 to thereby determine the number of times the job has been run. This number is then compared to the retry parameter. In alternative embodiments, the validation query can be built manually by the operator.

The example logging manager 208 is programmed to log the status information for each job. As described further below, the logging manager 208 can log such status information as the start date of the job, the status of the job, the success or failure of the job, etc. The logging manager 208 can be programmed to store this information in the database 114.

For example, the logging manager 208 can write the status information for the job to the database 114, such as "success" or "failed". There are many different reasons that a job can fail. Examples of such failures include: (i) execution command provided failed due to server/environment issue; (ii) execution command provided failed due to incorrect job information; and/or there is no record present at source for the ingestion date.

In some embodiments, the logging manager 208 is further programmed to capture the cause of the failure when updating the record for the job in the database 114. For example, upon a failure, the logging manager 208 can store the cause of the failure in a comments field for the job in the database 114. Examples of such notations include: source data missing (data for ingestion was not found); rerun limit exceeded (retry parameter exceeded); and/or rerun failed partition (failure of partition for storing ingested data). In yet another example, the logging manager 208 can capture other data associated with the job, even upon successful execution. For instance, the logging manager 208 can capture the reasons a job was run, such as "requested rerun" for a job that was manually executed by the user. Many other examples are possible.

By capturing the cause of the failure, the results manager 206 can be programmed to provide that information to the user for a particular job. Further, the results manager 206 can be programmed to provide trending and traceability for various jobs to allow for a better understanding of the system 100.

Figure 3:
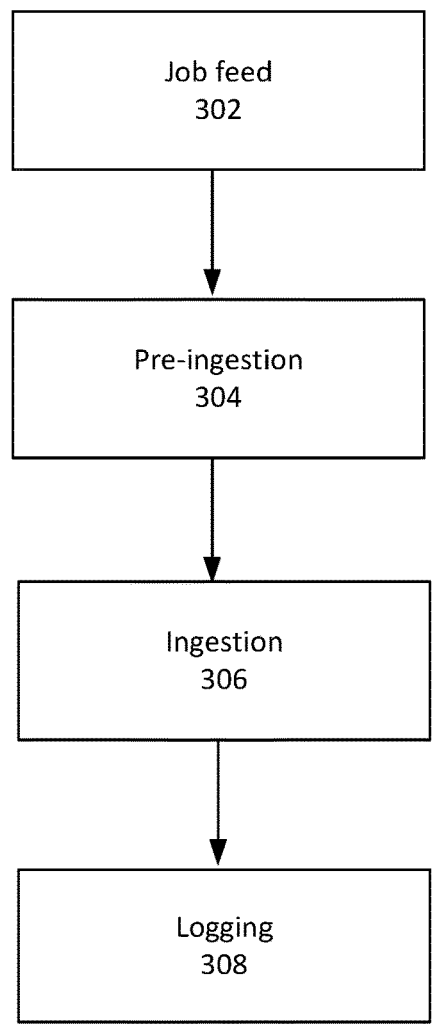
FIG. 3 shows an example method for ingesting jobs performed by the ingestion server of FIG. 2.

Referring now to FIG. 3, an example method 300 for ingesting a job by the system 100 is shown.

At operation 302, a job is received, such as from one of the clients 102, 104, 106. As noted, the format of these jobs can vary depending on the client and the data.

Next, at operation 304, the pre-ingestion metadata associated with the job is captured. In some examples, this metadata can include information about the data itself, along with such information as one or more of: (i) a unique control identifier (GUID) for the job; and (ii) time for ingestion. As noted, this metadata can be stored in the database 114.

Next, at operation 306, the data is ingested into the system 100. As noted, this can involve various processing and transformation of the data, accessing external data, etc. The ingested data is stored in the database 112.

Finally, at operation 308, the status information associated with the job is logged in the database 114. As described further below, the status information can include whether the job was successful or failed. When the job is not successful, the status information can also include information about retrying the job at periodic intervals until the retry parameter is exceeded, as noted further below.

Figure 4:
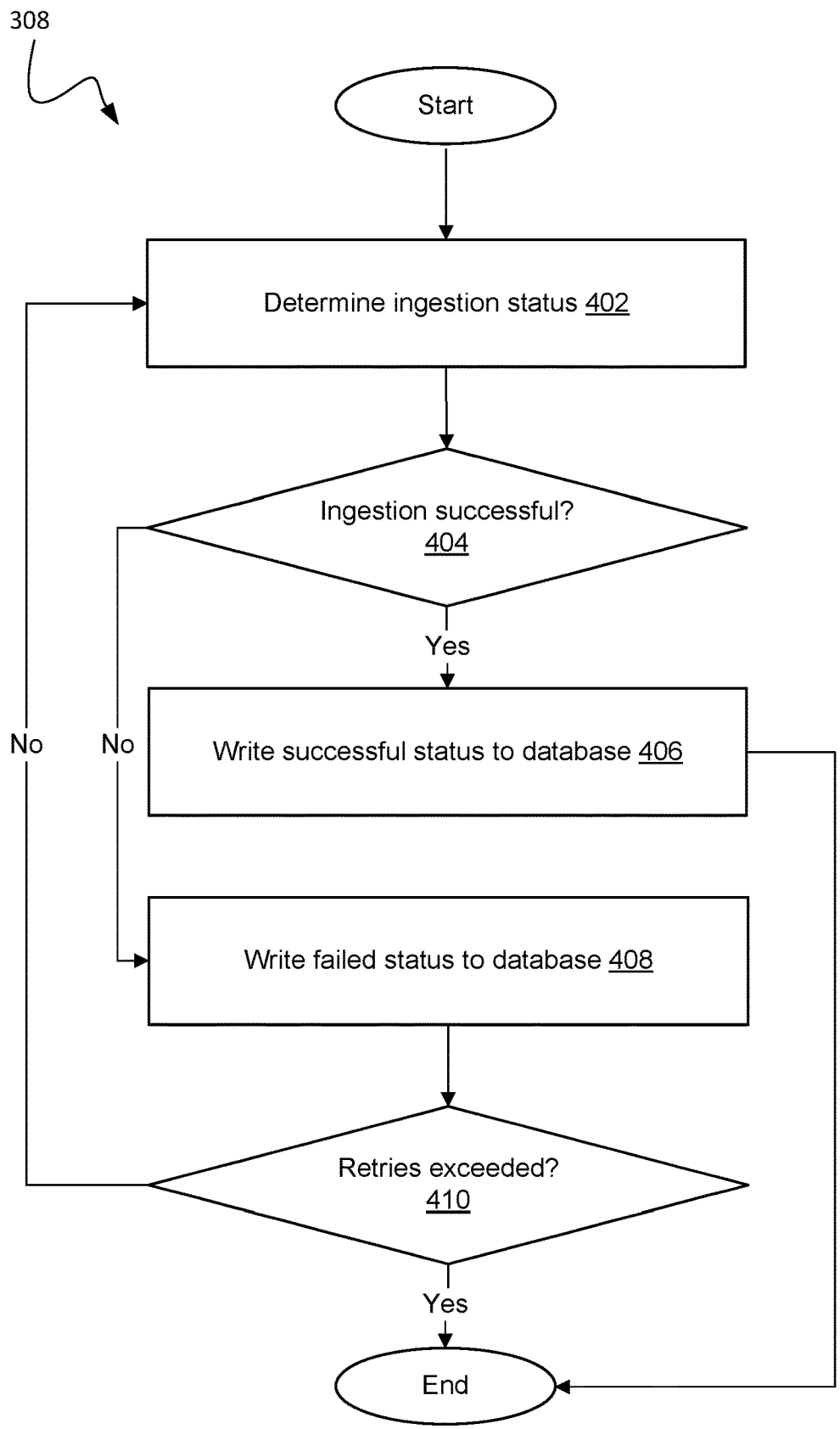
FIG. 4 shows another example method for ingesting jobs performed by the ingestion server of FIG. 2.

Referring now to FIG. 4, additional details on operation 308 as implemented by the logging manager 208 of the system 100 is shown. These details function to allow the system 100 to automate the process for retrying jobs that fail.

At operation 402, a determination of the status of the job is made. As described further below, this determination can be made by the logging manager 208 querying the database 114 to obtain the metadata associated with the job.

Next, at operation 404, a determination is made whether the ingestion of the job was successful. If the job was successful, control is passed to operation 406. One or more fields in the metadata associated with the job that indicate the status of the job (e.g., "success") are the updated in the database 114, as noted further below. The method 300 then ends.

Alternatively, if the job failed, control is passed to operation 408, and one or more fields in the metadata associated with the job that indicate the status of the job (e.g., "failed") are the updated in the database 114, as noted further below.

Next, at operation 410, a determination is made regarding whether a number of retries has exceeded the retry parameter for the job.

For instance, as noted, the retry parameter (such as four) can be set as the number of times a job will be retried upon failure. This retry parameter can be set as a default for the system 100 and/or populated in the metadata stored in the database 114 associated with each job. The system 100 can be programmed to retry the job at periodic intervals until the job is successful or the number of failed retries exceeds the retry parameter.

If the number of retires has not exceeded the retry parameter, control is passed back to operation 402, and ingestion is retried at a specified periodic interval. Otherwise, if the number of retries has been exceeded, the method 300 ends.

Figure 5:
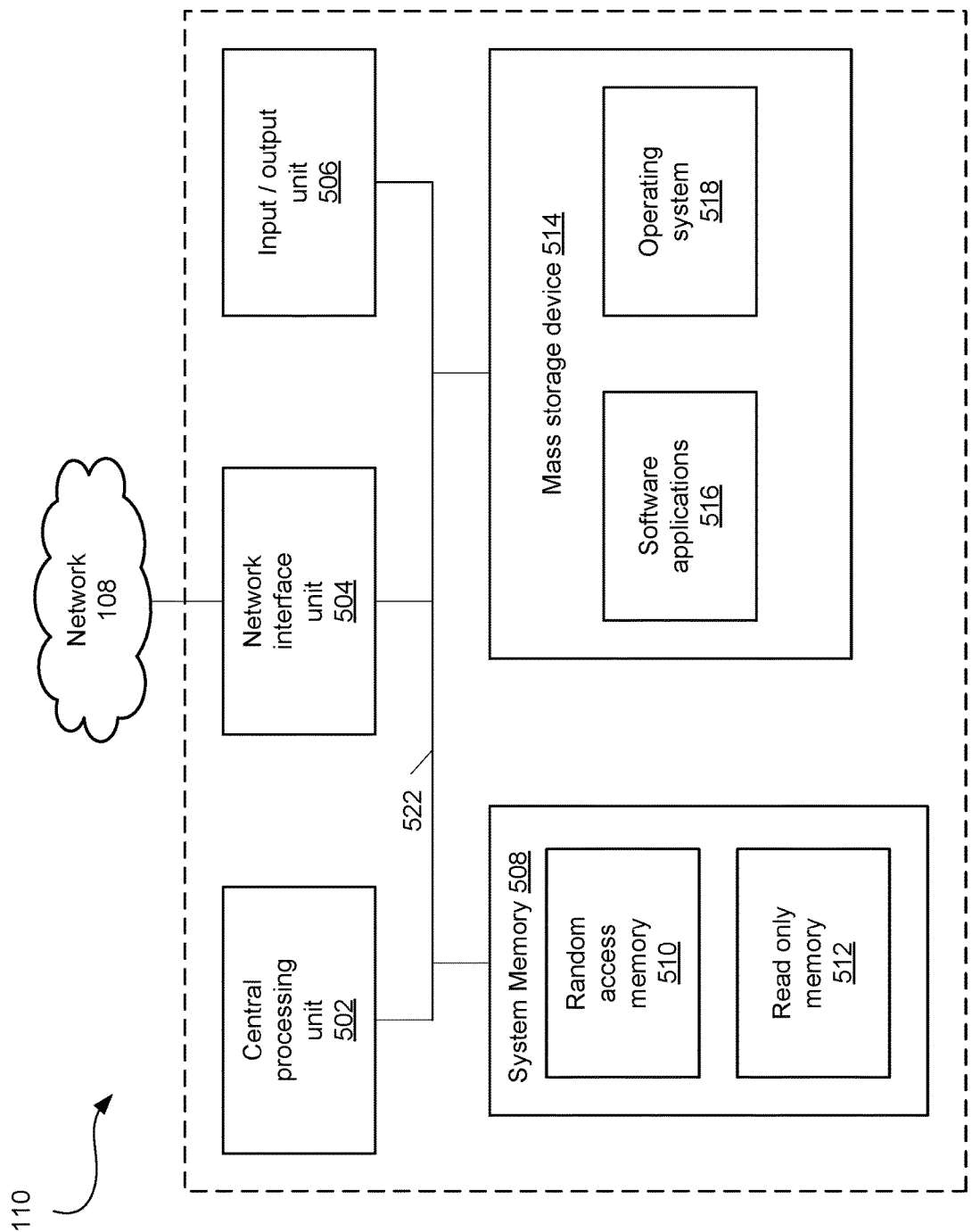
FIG. 5 shows example components of the ingestion server of FIG. 2.

FIG. 5 schematically shows additional example components of portions of the system 100 of FIG. 1. In particular, additional components of the ingestion server 110 are illustrated. In this example, the ingestion server 110 provides the computing resources to perform the functionality associated with the system 100. The other computing resources associated with the system 100 can be similarly configured.

The ingestion server 110 can be an internally controlled and managed device (or multiple devices). Alternatively, the ingestion server 110 can represent one or more devices operating in a shared computing system external to the enterprise or institution, such as a cloud.

Via the network 108, the components of the ingestion server 110 that are physically remote from one another can interact with one another.

The ingestion server 110 includes a central processing unit or processor 502, a system memory 508, and a system bus 522 that couples the system memory 508 to the processor 502.

The system memory 508 includes a random access memory ("RAM") 510 and a read-only memory ("ROM") 512. A basic input/output system that contains the basic routines that help to transfer information between elements within the ingestion server 110, such as during startup, is stored in the ROM 512.

The ingestion server 110 further includes a mass storage device 514. The mass storage device 514 is able to store software instructions and data.

The mass storage device 514 is connected to the processor 502 through a mass storage controller (not shown) connected to the system bus 522. The mass storage device 514 and its associated computer-readable data storage media provide non-volatile, non-transitory storage for the ingestion server 110. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the ingestion server 110.

According to various embodiments of the invention, the ingestion server 110 may operate in a networked environment using logical connections to remote network devices through the network 108, such as a wireless network, the Internet, or another type of network. The ingestion server 110 may connect to the network 108 through a network interface unit 504 connected to the system bus 522. It should be appreciated that the network interface unit 504 may also be utilized to connect to other types of networks and remote computing systems. The ingestion server 110 also includes an input/output unit 506 for receiving and processing input from a number of other devices, including a touch user interface display screen, an audio input device, or another type of input device. Similarly, the input/output unit 506 may provide output to a touch user interface display screen or other type of output device.

As mentioned briefly above, the mass storage device 514 and/or the RAM 210 of the ingestion server 110 can store software instructions and data. The software instructions include an operating system 518 suitable for controlling the operation of the ingestion server 110. The mass storage device 514 and/or the RAM 210 also store software instructions and applications 516, that when executed by the processor 502, cause the ingestion server 110 to provide the functionality described above.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A system, comprising:
    at least one processor; and
    non-transitory computer-readable storage storing instructions that, when executed by the at least one processor, cause the system to:
        generate an ingestion manager programmed to ingest data associated with a job; and
        generate a logging manager programmed to capture metadata associated with the job;
        wherein the ingestion manager is programmed to automatically retry the job based upon the metadata captured by the logging manager;
        wherein the metadata includes a retry parameter that defines a total number of retries for the job;
        wherein the metadata includes a frequency parameter that defines a frequency at which the job is retried; and
        wherein the frequency parameter is variable based upon a type of the job to be retried.

2. The system of claim 1, wherein the logging manager is further programmed to capture a status of the job as a success or a failure.

3. The system of claim 2, wherein the ingestion manager is further programmed to retry the job when the status of the job is the failure.

4. The system of claim 2, wherein the ingestion manager is further programmed to validate the metadata associated with the job.

5. The system of claim 1, wherein the ingestion manager is further programmed to retry the job until a threshold is reached.

6. The system of claim 1, comprising further instructions that, when executed by the at least one processor, cause the system to allow the job to be rerun on an ad hoc basis upon input from a user.

7. The system of claim 1, comprising further instructions that, when executed by the at least one processor, cause the system to validate a number of times the job has been retried.

8. The system of claim 1, comprising further instructions that, when executed by the at least one processor, cause the system to allow for a date range to be defined for the retry of the job.

9. The system of claim 8, wherein the date range is specified based upon a current date.

10. The system of claim 1, comprising further instructions that, when executed by the at least one processor, cause the system to store the metadata in a database.

11. A method, comprising:
    ingesting data associated with a job;
    capturing metadata associated with the job; and
    automatically retrying the job based upon the metadata;
    wherein the metadata includes a retry parameter that defines a total number of retries for the job;
    wherein the metadata includes a frequency parameter that defines a frequency at which the job is retried; and
    wherein the frequency parameter is variable based upon a type of the job to be retried.

12. The method of claim 11, further comprising capturing a status of the job as a success or a failure.

13. The method of claim 12, further comprising retrying the job when the status of the job is the failure.

14. The method of claim 12, further comprising capturing a reason for the failure.

15. The method of claim 11, further comprising retrying the job until a threshold is reached.

16. The method of claim 11, further comprising allowing the job to be rerun on an ad hoc basis upon input from a user.

17. The method of claim 11, further comprising generating a query to validate a number of times the job has been retried.

18. The method of claim 11, further comprising allowing for a date range to be defined for the retry of the job.

19. The method of claim 18, further comprising specifying the date range based upon a current date.

20. The method of claim 11, further comprising generating an ingested data count capture through an automated query.

\* \* \* \* \*